(12) United States Patent
Schafer et al.

(10) Patent No.: US 11,078,924 B2
(45) Date of Patent: Aug. 3, 2021

(54) FRAME DEVICE FOR A RADIATOR FAN MODULE, RADIATOR FAN MODULE COMPRISING A FRAME DEVICE AND MOTOR VEHICLE COMPRISING A RADIATOR FAN MODULE OF THIS TYPE

(71) Applicant: Brose Fahrzeugteile GmbH & Co. Kommanditgesellschaft, Würzburg, Würzburg (DE)

(72) Inventors: Tilman Schafer, Edewecht (DE); Antje Findeisen, Oldenburg (DE)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 257 days.

(21) Appl. No.: 15/784,349

(22) Filed: Oct. 16, 2017

(65) Prior Publication Data
US 2018/0128286 A1    May 10, 2018

(30) Foreign Application Priority Data

Nov. 4, 2016   (DE) .......................... 102016221642.2

(51) Int. Cl.
*F04D 29/52* (2006.01)
*F04D 25/08* (2006.01)
(Continued)

(52) U.S. Cl.
CPC ............ *F04D 29/522* (2013.01); *B60K 11/04* (2013.01); *F04D 25/08* (2013.01); *F04D 29/544* (2013.01);
(Continued)

(58) Field of Classification Search
CPC .... F04D 29/544; F04D 29/526; F04D 19/002; F04D 25/06; F04D 25/0606; F04D 25/08;
(Continued)

(56) References Cited

U.S. PATENT DOCUMENTS 4,548,548 A * 10/1985 Gray, III ................... F01P 5/06
                                                  123/41.49
4,636,669 A *  1/1987 Plunkett ............... F04D 19/002
                                                    310/51

(Continued)

FOREIGN PATENT DOCUMENTS

DE         4105378 A1     8/1992
DE      202011110429 U1    2/2014
DE      102015107907 A1   11/2016

OTHER PUBLICATIONS

Search Report in DE102016221642.2 dated Sep. 15, 2017.

*Primary Examiner* — Dominick L Plakkoottam
(74) *Attorney, Agent, or Firm* — Manelli Selter PLLC; Edward Stemberger

(57) ABSTRACT

The present invention relates to a frame device for a radiator fan module for a motor vehicle, including a frame opening in which a motor seat for receiving a motor is arranged. The motor seat is connected to a frame edge of the frame opening by means of connecting struts. Each connecting strut comprises an inner end connected to the motor seat and an outer end connected to the frame edge of the frame opening. The setting angle of the profile of the respective connecting struts is adapted to the outflow direction of the air flowing out through the frame opening, over the length of the connecting strut from the inner end to the outer end of the connecting strut, such that the flow resistance of the respective connecting struts is as low as possible.

18 Claims, 4 Drawing Sheets

(51) Int. Cl.
  *F04D 29/58*  (2006.01)
  *F04D 29/54*  (2006.01)
  *B60K 11/04*  (2006.01)
  *B60K 11/08*  (2006.01)
  *F04D 25/06*  (2006.01)

(52) U.S. Cl.
  CPC ............ *F04D 29/584* (2013.01); *B60K 11/08* (2013.01); *F04D 25/06* (2013.01)

(58) Field of Classification Search
  CPC .... F04D 29/325; F04D 29/522; F04D 29/646; F04D 29/661; F04D 29/663
  See application file for complete search history.

(56) References Cited

U.S. PATENT DOCUMENTS

| | | | | |
|---|---|---|---|---|
| 5,577,888 A * | 11/1996 | Capdevila | ............ | F04D 29/325 415/210.1 |
| 5,758,716 A * | 6/1998 | Shibata | ................ | F04D 19/002 123/41.49 |
| 6,024,536 A * | 2/2000 | Tsubakida | .......... | B60H 1/00464 415/173.6 |
| 6,065,937 A * | 5/2000 | Hunt | ..................... | F04D 29/326 416/169 A |
| 6,139,265 A * | 10/2000 | Alizadeh | ............... | F04D 29/544 415/208.1 |
| 7,334,988 B2 * | 2/2008 | Horng | .................... | F04D 29/667 415/211.2 |
| 7,478,993 B2 * | 1/2009 | Hong | ................... | F04D 29/547 415/211.2 |
| 7,654,793 B2 * | 2/2010 | Savage | ................. | F04D 29/661 415/208.2 |
| 7,811,055 B2 * | 10/2010 | Stommel | ................... | F01P 5/06 415/191 |
| 7,909,572 B2 * | 3/2011 | Suzuki | .................. | F04D 29/544 415/211.2 |
| 8,616,859 B2 * | 12/2013 | Kroeg | ................... | F04D 29/526 248/612 |
| 9,022,722 B2 * | 5/2015 | Liu | ....................... | F04D 29/542 415/58.5 |
| 10,337,525 B2 * | 7/2019 | Havel | .................... | F04D 29/544 |
| 2007/0122271 A1 * | 5/2007 | Ishihara | .............. | F04D 25/0613 415/191 |
| 2007/0140844 A1 * | 6/2007 | Yoshida | .............. | F04D 25/0613 415/220 |
| 2008/0280552 A1 * | 11/2008 | Baker | ..................... | F04D 25/14 454/229 |
| 2009/0090314 A1 * | 4/2009 | Ulrich | .................. | B29C 45/14311 123/41.49 |
| 2012/0308373 A1 | 12/2012 | Farlow et al. | | |
| 2015/0176596 A1 * | 6/2015 | Gossling | ................. | H02K 5/00 417/423.1 |

* cited by examiner

Section A - A:

Section B - B:

Section A - A:

FRAME DEVICE FOR A RADIATOR FAN MODULE, RADIATOR FAN MODULE COMPRISING A FRAME DEVICE AND MOTOR VEHICLE COMPRISING A RADIATOR FAN MODULE OF THIS TYPE

FIELD OF THE INVENTION

The present invention relates to a frame device for a radiator fan module, to a radiator fan module comprising a frame device and to a vehicle, in particular a motor vehicle, comprising a radiator fan module.

TECHNICAL BACKGROUND

Currently, radiator fan modules are used to cool the engine in motor vehicles. A radiator fan module usually consists of an impeller, a frame and a motor, by means of which the impeller is driven. The motor is received in and fastened to the frame for this purpose. In this case, the struts of the frame may lead to an increase in the flow resistance and therefore to aerodynamic and acoustic problems.

DE 41 05 378 A1 also discloses an axial fan which comprises an impeller, an electric motor driving the impeller and an air deflector arranged downstream of the impeller in the flow direction. The air deflector consists of an inner mount for the electric motor, a support ring that is coaxial with the mount and surrounds said mount with radial spacing, and a plurality of struts that extend between the mount and the support ring and are substantially transverse to the flow direction. In this case, all the struts projecting from the mount do not extend radially with respect to the fan axis, but so as to be inclined at an acute angle relative to the radial direction.

SUMMARY OF THE INVENTION

Against this background, there is the need to provide an improved frame device for a radiator fan module for a motor vehicle.

Accordingly, a frame device for a radiator fan module, in particular a radiator fan module for a vehicle, is provided which comprises:

a frame opening in which a motor seat for receiving a motor is arranged, wherein the motor seat is connected to a frame edge of the frame opening by means of connecting struts, wherein each connecting strut comprises an inner end connected to the motor seat and an outer end connected to the frame edge of the frame opening, wherein the setting angle of the profile of the respective connecting struts is adapted to the outflow direction of the air flowing out through the frame opening, over the length of the connecting strut from the inner end to the outer end of the connecting strut, such that the flow resistance of the respective connecting struts is as low as possible.

The basic concept of the invention is to adapt the profile of the respective connecting struts to the flow direction or outflow direction of the air conveyed through the frame opening, over the length of the connecting strut, such that the connecting struts produce flow resistance (no deflecting device) that is as low as possible.

This is advantageous in that a connecting strut having a simple and thus cost-effective profile can be used, and furthermore, flow deflection involving losses is not used.

Furthermore, a radiator fan module comprising a frame device of this type and a vehicle, in particular a motor vehicle, comprising a radiator fan module of this type are provided.

Advantageous embodiments and developments will become apparent from the additional dependent claims and from the description, together with reference to the figures of the drawings.

In another embodiment according to the invention, a connecting-strut angle of the relevant connecting strut is the angle between a tangent to the frame opening and the profile centre line of the profile of the connecting strut. The connecting-strut angle of the relevant connecting strut is constant and/or varies over at least some of the length or the entire length of the connecting strut. The connecting-strut angle may for example be adapted or suitably varied in a targeted manner by suitable simulation or measurement of the outflow downstream of the frame device.

In another embodiment according to the invention, the connecting-strut angle of the relevant connecting strut is constant, increases, and/or decreases over at least some of the length or the entire length of the connecting strut from the inner end to the outer end of the connecting strut.

According to an embodiment according to the invention, the connecting-strut angle of the relevant connecting strut increases, for example continuously or discontinuously, over the length of the connecting strut from the inner end thereof to the outer end thereof. The angle at the inner end of the relevant connecting strut is in a range of from 40° to 60° and increases, for example continuously or discontinuously, e.g. to an angle in a range of from 55° to 75° up to the outer end. In this way, a frame device comprising connecting struts which have the lowest possible flow resistance can be provided.

In an embodiment according to the invention, the profile thickness of the profile of the relevant connecting strut or piece is constant and/or varies over the length of the connecting piece from the inner end thereof to the outer end thereof. For example, the profile thickness of the profile of the relevant connecting piece, at least in one portion, may be constant, may increase or may decrease over the length of the connecting piece from the inner end thereof to the outer end thereof.

In another embodiment according to the invention, the profile thickness of the profile of the relevant connecting piece is adapted depending on the strength requirements imposed on the connecting strut and/or depending on the requirement for an injection-moulding tool to be filled in order to injection-mould the frame device. In this way, a frame device can be provided which can be produced in a stable manner and so as to be cost-effective when an injection-moulding process is used as the manufacturing method, and has low flow resistance in this case.

In an embodiment according to the invention, the profile of the respective connecting pieces is designed to be as aerodynamically efficient as possible. For example, one or both ends of the profile is/are rounded and suitable in terms of aerodynamics and/or manufacturing, at least over some of the length or the entire length of the connecting element from the inner end thereof to the outer end thereof.

In an embodiment according to the invention, the connecting pieces of the frame device are arranged over the periphery of the motor seat radially relative to, in the rotational direction of or counter to the rotational direction of a motor that can be received in the motor seat. In this way, a wide range of frame devices for a variety of applications and purposes can be produced which have the lowest possible flow resistance.

The above embodiments and developments can be combined with one another as desired, where appropriate. Further possible embodiments, developments and implementations of the invention also include combinations, which are not explicitly mentioned, of features of the invention that have been previously described or are described in the following with respect to the embodiments. In particular, a person skilled in the art will also add individual aspects as improvements or additions to the relevant basic form of the present invention.

BRIEF DESCRIPTION OF THE DRAWINGS

The present invention is explained below in greater detail with reference to the embodiments specified in the schematic figures in the drawings, in which.

Figure 1:
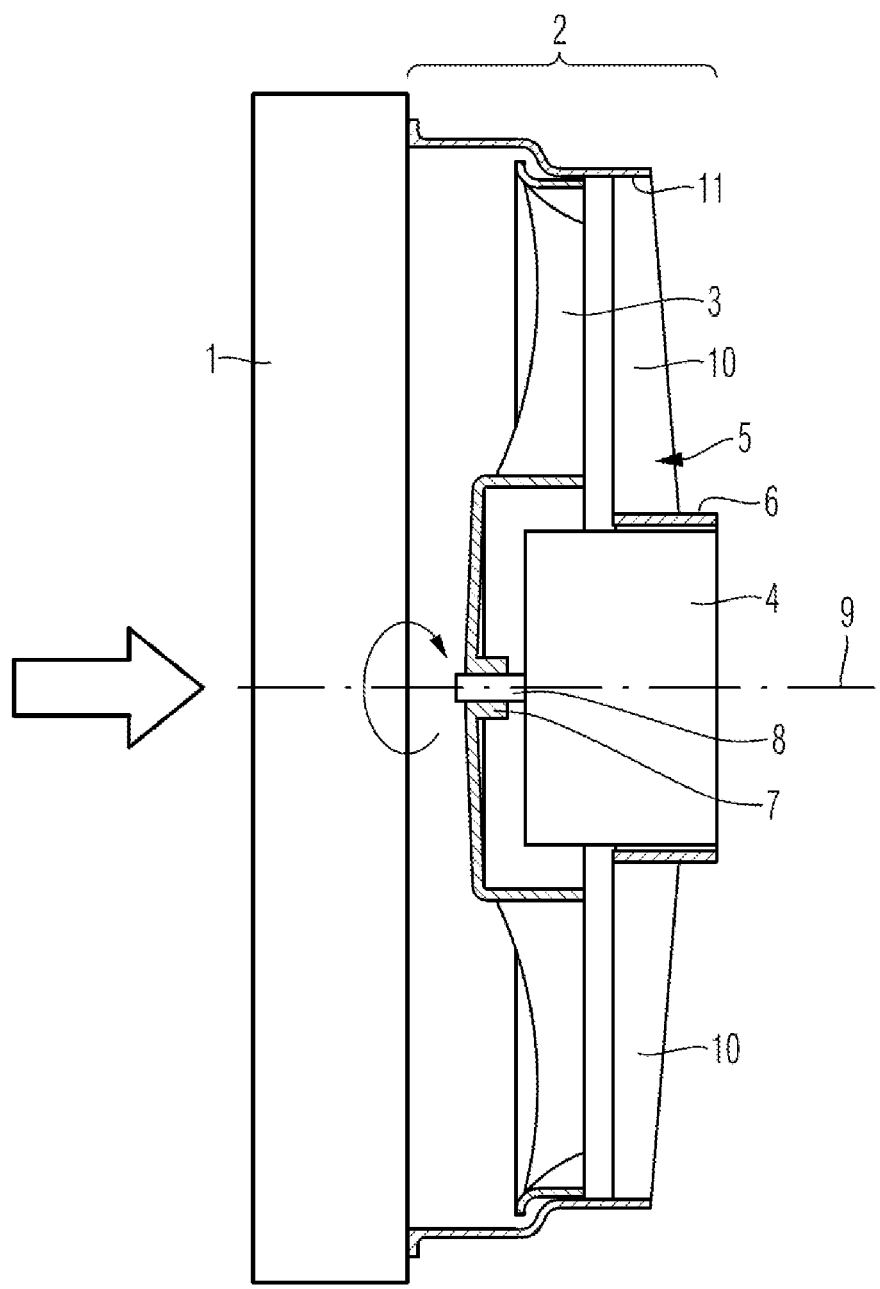
FIG. 1 is a sectional view through a motor radiator and a conventional radiator fan module.

The accompanying drawings are intended to provide further understanding of the embodiments of the invention. They illustrate embodiments and, together with the description, are used to explain principles and concepts of the invention. Other embodiments and many of the mentioned advantages will become apparent from the drawings. The elements of the drawings are not necessarily shown to scale relative to one another.

In the figures of the drawings, identical, functionally identical and identically operating elements, features and components are provided in each case with the same reference numerals, unless indicated otherwise.

DETAILED DESCRIPTION OF EXAMPLE EMBODIMENTS

FIG. 1 is a highly simplified, purely schematic and not-to-scale sectional view of a motor radiator 1 and of a conventional radiator fan module 2 coupled to the motor radiator 1. In the example shown in FIG. 1, the radiator fan module 2 is attached to the back of the motor radiator 1. Likewise, the radiator fan module 2 may also be arranged on the front of the motor radiator 1, depending on function and purpose. As shown by an arrow in FIG. 1, the air flows through the motor radiator 1 and then through the radiator fan module 2 arranged therebehind.

Here, the radiator fan module 2 comprises an impeller 3 and a motor 4, in particular an electric motor, for driving the impeller 3. Furthermore, the radiator fan module 2 comprises a frame device 5 arranged downstream of the impeller 3 in the flow direction in FIG. 1. In the embodiment shown in FIG. 1, the motor 4, in this case e.g. the electric motor, is received and held in a motor seat 6, in this case a motor retaining ring. The impeller hub 7 of the impeller 3 is in turn arranged on a shaft 8 of the motor 4 and is driven by means of the motor 4 such that it rotates about its longitudinal axis 9 in the form of a rotational axis.

As shown in FIG. 1, the frame device 5 comprises a plurality of struts 10, which extend outwards from the motor seat 6 towards a frame opening edge 11, which is part of the frame device 5.

Figure 2:
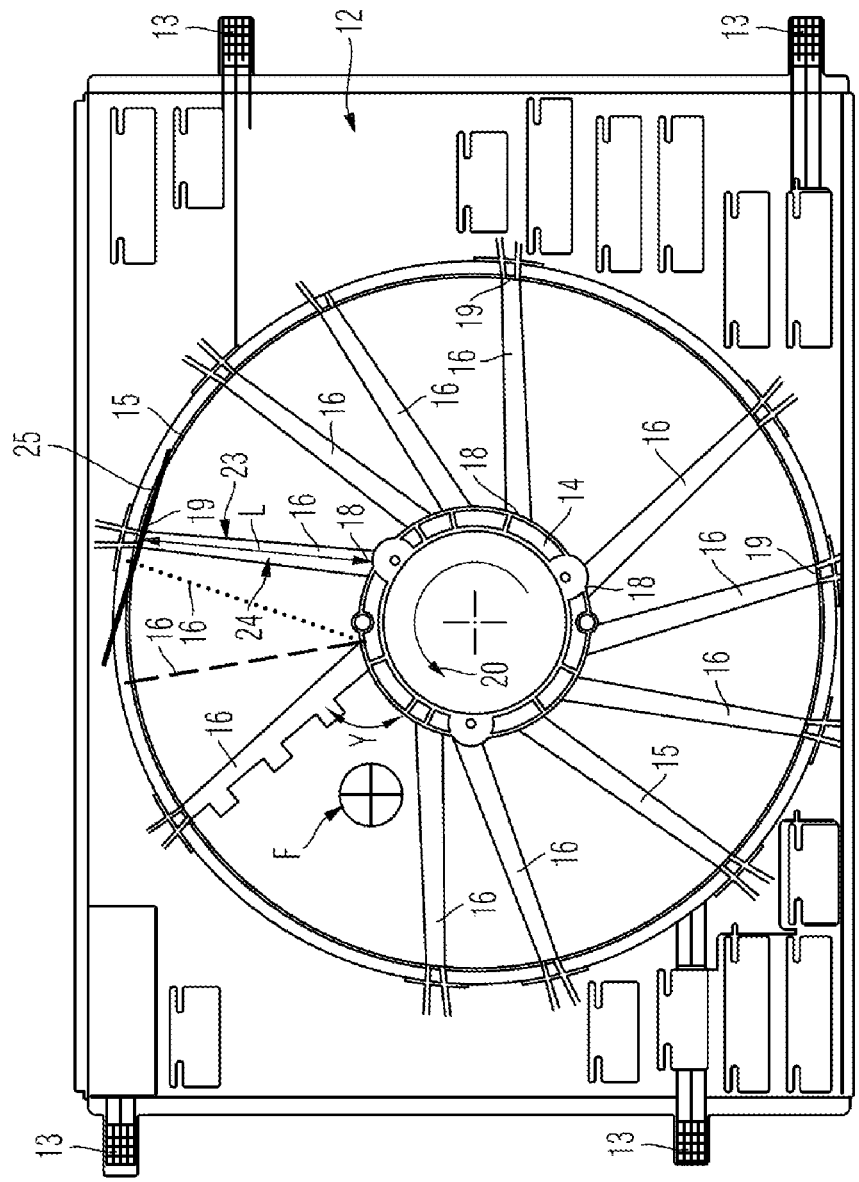
FIG. 2 is a front view of a frame device according to the invention for a radiator fan module.

FIG. 2 is a rear view of a frame device 12 according to the invention for a radiator fan module 2, as can be used for example in the highly simplified, purely schematic radiator fan module 2 that is not to scale and is shown in FIG. 1.

In the embodiment shown in FIG. 2, the frame device 12 for example has a polygonal, e.g. rectangular, shape. The frame device 12 may however also have other shapes, e.g. a circular, oval and/or polygonal shape, depending e.g. on the associated impeller of the radiator fan module and/or on the shape of the motor radiator, etc. In the embodiment shown in FIG. 3, the frame device 12 for example comprises a plurality of fastening portions 13 for fastening the frame device 12 e.g. to the associated motor radiator and/or to the impeller.

The frame device 12 also comprises a motor seat 14 for receiving a motor for driving the associated impeller. For example, an electric motor can be used as the motor, although the invention is not limited to electric motors.

Here, the motor seat 14 is provided in a circular frame opening 15 in the frame device 12 in FIG. 2 and is connected to the rest of the frame opening 15 and in particular to a frame opening edge 17 of the frame opening 15 by means of connecting struts 16. In this case, the connecting struts 16 are connected to the motor seat 14 at the inner end 18 thereof and are connected to the frame opening edge 17 of the frame opening 15 at the outer end 18 thereof.

Most fan frames have motor-retaining struts that are attached on the pressure side of the impeller. Here, there is the variant having a few, i.e. three to seven, thick struts, or the variant having many thin struts. A drawback of both variants is the air outflow being impeded. In sub-variants of the two above-mentioned variants, the strut profile is curved or additionally profiled when viewed in cross section. This is intended to cause the outflow to be deflected in the axial direction, in order to thus keep the losses of the outflow low. Owing to there only usually being a very small amount of installation space available, the struts may be designed to be only very short in the axial direction. In order to then achieve the desired flow deflection over a very short extension length, an accordingly high number of struts of this type need to be used. This in turn leads to an increase in the loss due to the flow resistance of each individual strut. Therefore, the energy recovery achieved by the deflection is then reduced by the resulting increase in the overall resistance of the strut grating.

In the frame device 12 according to the invention, as shown in FIG. 2 and the subsequent figures, FIGS. 3 to 6, the connecting struts 16 are therefore designed so as to be dependent on the outflow angle of the air through the frame opening, as explained in the following with reference to FIGS. 3 to 6. Here, the air flows through the impeller of the radiator fan module and then the air flows out through the frame device 5 in FIG. 1 or the frame device 12 according to the invention in FIG. 2. The air flowing out through the frame device 12 according to the invention is indicated in a highly simplified manner by an arrow F.

As shown in FIG. 2, the connecting struts 16 may for example be inclined towards the outer periphery of the motor seat, as indicated by an arrow, at an angle γ, e.g. an acute angle, in the rotational direction 20 of the motor of the radiator fan module. Likewise, the connecting struts 16 may also be arranged radially, as shown by a dashed line for a connecting strut 16 in FIG. 2. Furthermore, the connecting struts 16 may also be inclined at an angle counter to the rotational direction 20 of the motor of the radiator fan module, as shown by a dotted line for a connecting strut 16 in FIG. 2.

In the embodiment in which it is in the form of a motor retaining ring, the motor seat 14 of the frame device 12 is designed to receive and fasten the motor. Likewise, the motor seat 14 may also be designed as a receiving cup in which the motor can be received and fastened. The invention is not limited to the specific embodiment shown in FIG. 2.

Figure 3:
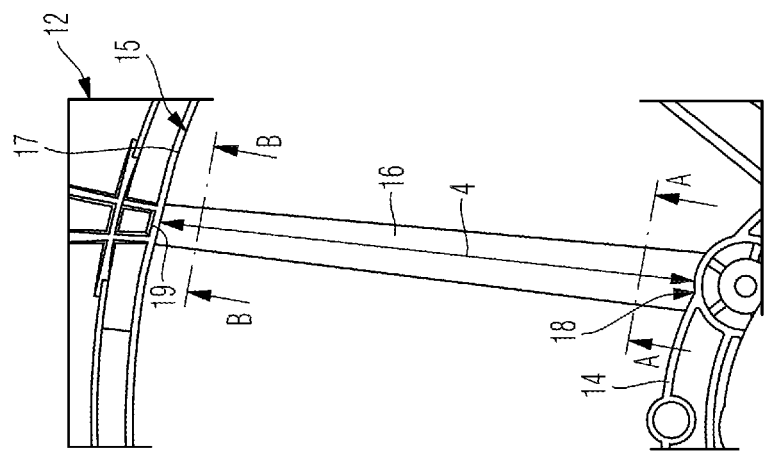
FIG. 3 is a detail of a connecting strut of the frame device according to FIG. 2.

FIG. 3 is a detail of a connecting strut 16 of the frame device 12 according to FIG. 2. As described above, the respective connecting struts 16 are connected to the motor seat 14 at the inner end 18 thereof and are connected to the frame opening edge 17 of the circular frame opening 15 at the outer end 19 thereof.

FIG. 3 indicates the two sections A-A and B-B through one of the connecting struts 16 of the frame device 12.

Here, the section A-A is provided in a portion of the inner end 18 of the connecting strut 16 and the section B-B is provided in a portion of the outer end 19 of the connecting strut 16.

Figure 4:
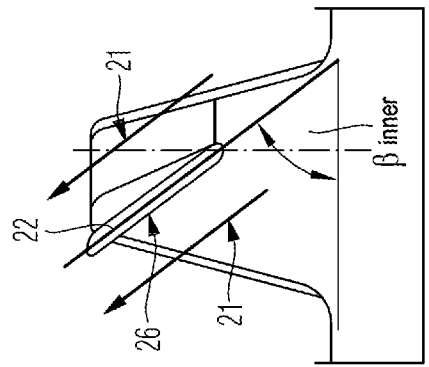
FIG. 4 is a sectional view A-A of the connecting strut in the region of the inner end of the connecting strut according to FIG. 3.
Figure 5:
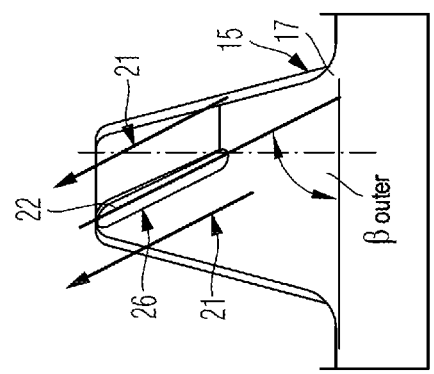
FIG. 5 is a sectional view B-B of the connecting strut in the region of the outer end of the connecting strut according to FIG. 3.

Here, FIG. 4 shows the sectional view A-A and FIG. 5 shows the corresponding sectional view B-B of the connecting strut 16 according to FIG. 3.

In the two sectional views in FIGS. 4 and 5, the outflow direction 21 of the air is also indicated by the arrows. As already described with reference to FIGS. 1 and 2, the air first flows out through the impeller of the radiator fan module and then through the frame opening 15 in the frame device 12. As also described above, the radiator fan module may be arranged on the front or back of an associated motor radiator, depending on function and purpose.

As is clear from the two sectional views A-A and B-B, the size of the connecting-strut angle β of the relevant connecting strut 16 is adapted to the path of the air flowing out through the frame opening 15.

As shown in the sectional view A-A in FIG. 4 for a cross-sectional profile 26 of the connecting strut 16 at a portion of the inner end 18 of the connecting strut 16, the connecting strut 16 has a connecting-strut angle βi in a range of between 40° and 60° or, expressed otherwise, of 50°±10°.

Here, the connecting-strut angle βi is the angle between the profile centre line 22 of the cross-sectional profile 26 of the connecting strut 16 and a tangent 25 to the circular frame opening 15.

The connecting-strut angle may in principle remain constant over the entire length L in FIG. 2 of the connecting strut from the inner end 18, i.e. from the attachment to the motor-cover seat 14, to the outer end 19, i.e. as far as the attachment to the frame opening edge 17 of the frame opening 15, or may vary over the length L of the connecting strut 16 depending on the outflow direction 21 of the air flowing out. For example, the size of the connecting-strut angle may be such that the connecting struts and the profile 26 thereof as in FIGS. 4 and 5 extends in parallel with or substantially in parallel with the outflow direction 21 of the air flowing out.

As shown in the sectional view B-B in FIG. 5 for a portion of the outer end 19 of the connecting strut 16, the connecting strut 16 has a connecting-strut angle βa in a range of between 55° and 75° or, expressed otherwise, of 65°±10°. As mentioned above, the connecting-strut angle βa is the angle between the profile centre line 22 of the profile of the connecting strut 16 and a tangent to the circular frame opening 15.

Figure 6:
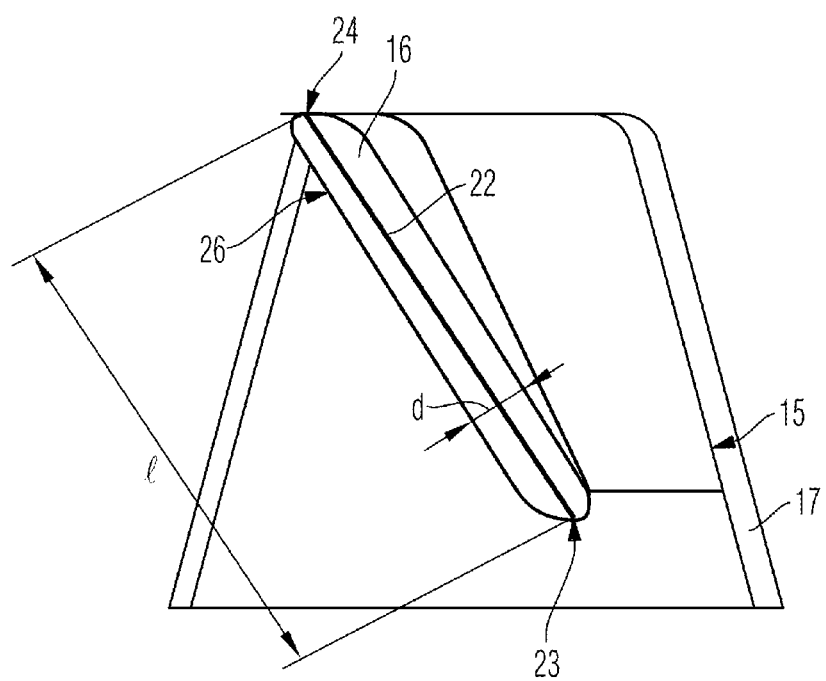
FIG. 6 is an enlarged detail of the region of the outer end of the connecting strut according to FIG. 5.

FIG. 6 is an enlarged detail of the portion of the inner end 18 of the connecting strut 16 according to FIG. 4. As mentioned above, FIG. 4 is the sectional view A-A according to FIG. 3.

As shown in FIG. 6, the profile of the connecting strut 16, here using the example of the portion of the inner end 18 of the connecting strut 16, has the simplest shape possible together with the lowest possible air resistance for the air flowing out. Here, one or both ends 23, 24 of the profile of the connecting strut 16 are rounded.

Furthermore, the length 1 of the profile 26 of the connecting strut 16 can be adapted to the strength requirements imposed on the connecting strut 16. For example, the length 1 of the profile 26 may be constant from the inner end 18 of the connecting strut 16 to the outer end 19 of the connecting strut 16, or may increase and/or decrease, for example may increase and/or decrease continuously or discontinuously, from the inner end 18 to the outer end 19.

The profile thickness d of the profile of the connecting struts 16 may for example be adapted to the strength requirements imposed on the connecting strut 16 and/or to the requirements for an associated injection-moulding tool to be filled if the frame device 12 is produced by injection-moulding.

Furthermore, the profile thickness d of the profile of the connecting struts 16 may be constant from the inner end 18 of the respective connecting struts 16 to the outer end 19 of the respective connecting struts 16, or may increase and/or decrease, for example may increase and/or decrease continuously or discontinuously, from the inner end 18 to the outer end 19.

Although the present invention has hitherto been described entirely by way of preferred embodiments, it is not limited thereto, but can be modified in various ways.

LIST OF REFERENCE SIGNS

1 motor radiator
2 radiator fan module
3 impeller
4 motor
5 frame device
6 motor seat
7 impeller hub
8 shaft
9 longitudinal axis
10 strut
11 frame opening edge
12 frame device
13 fastening portion
14 motor seat
15 frame opening
16 connecting strut
17 frame opening edge
18 inner end
19 outer end
20 rotational direction of the motor
21 outflow direction
22 profile centre line
23 first end
24 second end
25 tangent
26 cross-sectional profile

The invention claimed is:
1. A frame device for a radiator fan module for a motor vehicle, the frame device comprising:
a frame opening in which a motor seat for receiving a motor is arranged, wherein the motor seat is connected to a frame edge of the frame opening by connecting struts, wherein each connecting strut comprises an inner end connected to the motor seat and an outer end connected to the frame edge of the frame opening, wherein a connecting-strut angle of the respective cross-sectional profile of each of the respective connecting struts is such that a respective centreline of the respective cross-sectional profile of each of the respective connecting struts is parallel with the outflow direction of non-deflected air flowing out through the frame opening, over the entire length of the centreline of each of the connecting struts from the inner end to the outer end of each of the respective connecting struts, such that the flow resistance of the respective connecting struts is as low as possible, and wherein the length of the cross-sectional profile of the relevant connecting strut decreases continuously or discontinuously from the inner end of the connecting strut to the outer end of the connecting strut.

2. The frame device of claim 1, wherein each connecting strut is configured such that it has as little an air-deflecting effect as possible.

3. The frame device of claim 1, wherein the connecting-strut angle of the relevant connecting strut is the angle between a tangent to the frame opening and the profile centre line of the cross-sectional profile of the connecting strut, the connecting-strut angle of the relevant connecting strut being constant over the entire length of the connecting strut.

4. The frame device of claim 1, wherein the connecting-strut angle of the relevant connecting strut is constant over the entire length of the connecting strut from the inner end to the outer end of the connecting strut.

5. The frame device of claim 1, wherein the profile thickness of the profile of the relevant connecting strut is constant over the length of the connecting strut from the inner end thereof to the outer end thereof.

6. The frame device of claim 5, wherein the profile thickness of the profile of the relevant connecting strut is adapted depending on the strength requirements imposed on the connecting strut or depending on an injection-moulding tool to be filled in order to injection-mould the frame device.

7. The frame device of claim 1, wherein the profile thickness of the profile of the relevant connecting strut varies over the length of the connecting strut from the inner end thereof to the outer end thereof.

8. The frame device of claim 7, wherein the profile thickness of the profile of the relevant connecting strut is adapted depending on the strength requirements imposed on the connecting strut.

9. The frame device of claim 7, wherein the profile thickness of the profile of the relevant connecting strut is adapted depending on an injection-moulding tool to be filled in order to injection-mould the frame device.

10. The frame device of claim 1, wherein the length of the cross-sectional profile of the relevant connecting strut varies over the length of the connecting strut from the inner end thereof to the outer end thereof.

11. The frame device of claim 1, wherein the cross-sectional profile of the relevant connecting strut is configured as a substantially rectangular cross-sectional profile.

12. The frame device of claim 11, wherein at least one of the ends of the profile is rounded and suitable in terms of aerodynamics or manufacturing.

13. The frame device of claim 1, wherein the connecting struts are arranged over the periphery of the motor seat radially relative to, in the rotational direction or counter to the rotational direction of a motor that can be received in the motor seat.

14. A radiator fan module comprising a frame device, the frame device comprising a frame opening in which a motor seat for receiving a motor is arranged, wherein the motor seat is connected to a frame edge of the frame opening by connecting struts, wherein each connecting strut comprises an inner end connected to the motor seat and an outer end connected to the frame edge of the frame opening, wherein a connecting-strut angle of the respective cross-sectional profile of each of the respective connecting struts is such that a respective centreline of the respective cross-sectional profile of each of the respective connecting struts is parallel with the outflow direction of non-deflected air flowing out through the frame opening, over the entire length of the centreline of each of the connecting struts from the inner end to the outer end of each of the respective connecting struts, such that the flow resistance of the respective connecting struts is as low as possible.

15. The radiator fan module of claim 14, wherein the radiator fan module is a radiator fan module which is configured for a motor vehicle.

16. A motor vehicle, comprising a radiator fan module comprising a frame device, the frame device comprising a frame opening in which a motor seat for receiving a motor is arranged, wherein the motor seat is connected to a frame edge of the frame opening by connecting struts, wherein each connecting strut comprises an inner end connected to the motor seat and an outer end connected to the frame edge of the frame opening, wherein a connecting-strut angle of the respective cross-sectional profile of each of the respective connecting struts is such that a respective centreline of the cross-sectional profile of each of the respective connecting struts is parallel with the outflow direction of non-deflected air flowing out through the frame opening, over the entire length of the centreline of each of the connecting struts from the inner end to the outer end of each of the respective connecting struts, such that the flow resistance of the respective connecting struts is as low as possible.

17. The motor vehicle of claim 16, wherein the motor vehicle comprises a motor radiator and the radiator fan module is provided either on the front or the back of the motor radiator.

18. Frame device for a radiator fan module for a motor vehicle comprising:

a circular frame opening in which a motor seat for receiving a motor is arranged, wherein the motor seat is connected to a frame edge of the frame opening by connecting struts, wherein each connecting strut comprises an inner end connected to the motor seat and an outer end connected to the frame edge of the frame opening, wherein a connecting-strut angle of the cross-sectional profile of the respective connecting struts is adapted to the outflow direction of the air flowing out through the frame opening, over the length of the connecting strut from the inner end to the outer end of the connecting strut, such that the flow resistance of the respective connecting struts is as low as possible, wherein the connecting-strut angle of the relevant connecting strut increases over the length of the connecting strut from the inner end thereof to the outer end thereof, the connecting-strut angle being in a range of from 40° to 60° at the inner end and increasing to an angle in a range of from 55° to 75° up to the outer end, wherein the length of the cross-sectional profile of the relevant connecting strut decreases continuously or discontinuously from the inner end of the connecting strut to the outer end of the connecting strut, and wherein the cross-sectional profile of each of the respective connecting struts is such that an entire length of a respective centreline of the respective cross-sectional profile of each of the respective connecting struts is parallel with 1) a non-deflected component of the outflow direction of the air flowing out through the frame opening at the inner end of each of the respective connecting struts and 2) a non-deflected component of the outflow direction of the air flowing out through the frame opening at the outer end of each of the respective connecting struts.

* * * * *